United States Patent
Guo et al.

(10) Patent No.: US 6,683,136 B2
(45) Date of Patent: *Jan. 27, 2004

(54) EPOXIDIZED SOYBEAN OIL ENHANCED HYDROGENATION OF NITRILE COPOLYMER

(75) Inventors: Sharon X. Guo, Stratford (CA); Paul Nguyen, London (CA)

(73) Assignee: Bayer Inc., Sarnia (CA)

( * ) Notice: Subject to any disclaimer, the term of this patent is extended or adjusted under 35 U.S.C. 154(b) by 81 days.

This patent is subject to a terminal disclaimer.

(21) Appl. No.: 10/027,762

(22) Filed: Dec. 19, 2001

(65) Prior Publication Data

US 2002/0128393 A1 Sep. 12, 2002

(30) Foreign Application Priority Data

Dec. 28, 2000 (CA) ............................................. 2329844

(51) Int. Cl.$^7$ .................................................. C08F 8/04
(52) U.S. Cl. .................... 525/329.3; 525/338; 525/339; 524/464
(58) Field of Search ............................. 525/329.3, 338, 525/339; 524/464

(56) References Cited

U.S. PATENT DOCUMENTS

| | | | |
|---|---|---|---|
| 3,673,281 A | 6/1972 | Bronstert et al. ....... | 260/880 B |
| 3,700,637 A | 10/1972 | Ginch, Jr. ................. | 260/83.3 |
| 4,464,515 A * | 8/1984 | Rempel et al. ............. | 525/338 |
| 4,631,315 A | 12/1986 | Buding et al. .............. | 525/338 |
| 4,647,627 A * | 3/1987 | Buding et al. .............. | 525/234 |
| 5,075,388 A * | 12/1991 | Rempel et al. ............. | 525/338 |
| 2002/0123574 A1 * | 9/2002 | Nguyen et al. .......... | 525/331.9 |

FOREIGN PATENT DOCUMENTS

| | | |
|---|---|---|
| DE | 658172 | 3/1938 |
| GB | 1558491 | 1/1980 |
| NL | 1004993 | 9/1998 |

OTHER PUBLICATIONS

Alger, "Polymer Science Dictionary", 2nd ed., Chapman & Hall, New York, p. 69, 335 (1997).*

* cited by examiner

*Primary Examiner*—D. R. Wilson
(74) *Attorney, Agent, or Firm*—Joseph C. Gil; Noland J. Cheung; Jennifer R. Seng

(57) ABSTRACT

The present invention provides a process of hydrogenating a nitrile copolymer rubber, which comprises subjecting the copolymer to hydrogenation in the presence of a hydrogenation catalyst, a co-catalyst, and a proton acceptor that is non-coordinating with the metal-complex catalyst.

31 Claims, 1 Drawing Sheet

Figure 1. Graph of the average percent hydrogenation of Krynac® X7.40 vs. time, as a function of the amount of added ESBO.
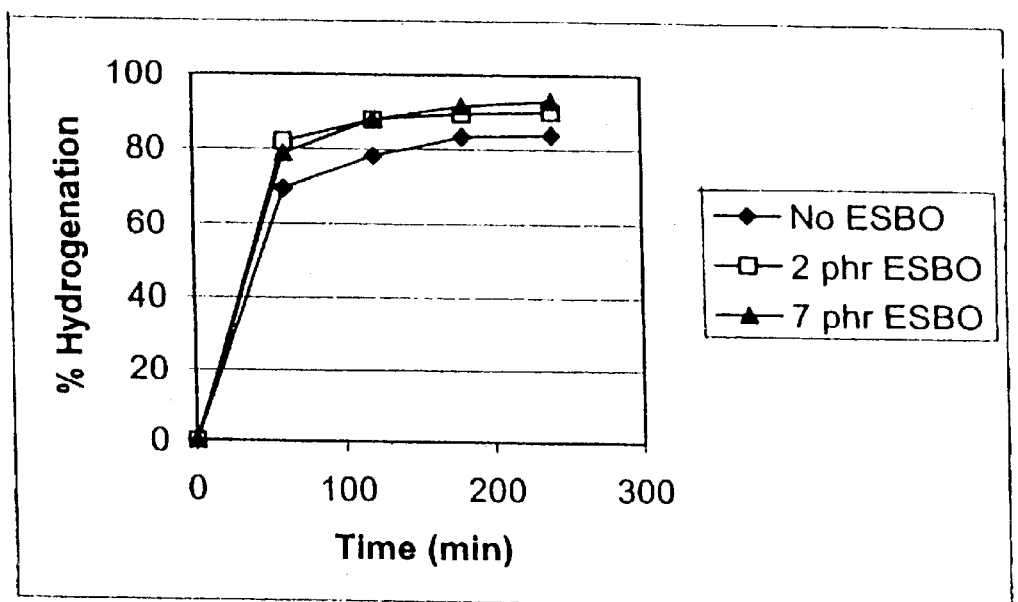

EPOXIDIZED SOYBEAN OIL ENHANCED HYDROGENATION OF NITRILE COPOLYMER

FIELD OF INVENTION

The present invention relates to a process of hydrogenating a nitrile-diene copolymer rubber.

BACKGROUND OF THE INVENTION

Nitrile rubbers obtained by the emulsion copolymerization of (meth)acrylonitrile with conjugated dienes, for example, butadiene, and optionally small amounts of other comonomers are known, for example, from German Pat. No. 658,172. In addition, it is known from U.S. Pat. No. 3,700,637 that nitrile rubbers of this type can be hydrogenated, the strength of the products thus obtained being improved, compared with the non-hydrogenated starting material.

According to German published Patent Application No. 25 39 132, the hydrogenation of statistical acrylonitrile butadiene copolymers in solution also gives products having improved properties. In this case, the reaction is selective with respect to the extent of hydrogenation.

SUMMARY OF THE INVENTION

It has now been found that metal-complex catalyzed hydrogenation of a nitrile-diene copolymer rubber, in the presence of a cocatalyst, can be accelerated by the addition of a small amount of a proton acceptor that is non-coordinating with the metal-complex catalyst. In addition, it has also been found that the amount of co-catalyst used can be lowered in the presence of the proton acceptor.

Accordingly, the present invention provides a process of hydrogenating a nitrile copolymer rubber, which comprises subjecting the copolymer to hydrogenation in the presence of a hydrogenation catalyst, a co-catalyst, and a proton acceptor that is non-coordinating with the metal-complex catalyst.

BRIEF DESCRIPTION OF THE DRAWING

FIG. 1 shows a graph of the average percent hydrogenation of Krynac® X7.40 vs. time, as a function of the amount of added ESBO.

DETAILED DESCRIPTION OF THE INVENTION

The non-coordinating proton acceptor is to be understood generally as any compound, which will accept a proton through protonation of a basic moiety. The proton acceptor should not coordinate with the metal of the hydrogenation catalyst. Some proton acceptors may coordinate with the metal-complex catalyst. This coordination is not desirable. Proton acceptors that have a significant adverse effect on the hydrogenation reaction should be avoided.

The non-coordinating proton acceptor may be a mono-, di-, or triacylglycerol comprising epoxide moieties, preferably a triacylglycerol comprising epoxide moieties.

More specifically, the non-coordinating proton acceptor may be a molecule of formula (I):

$$\begin{array}{l} -OR^1 \\ -OR^2 \\ -OR^3 \end{array} \qquad (I)$$

where $R^1$, $R^2$, and $R^3$ are, independently of each other, hydrogen or a group of formula (II):

$$(II)$$

where $n=1$ to 7,
$x=1$ to 3, and
$m=1$ to 6.
wherein at least one of $R^1$, $R^2$ or $R^3$ is other than hydrogen.

A specific example of such a non-coordinating proton acceptor is selected from the group of epoxidized soy bean oil (ESBO), epoxidized linseed oil, epoxidized corn oil, epoxidized coconut oil, epoxidized cottonseed oil, epoxidized olive oil, epoxidized palm oil, epoxidized palm kernel oil, epoxidized peanut oil, epoxidized cod liver oil, epoxidized tung oil, epoxidized beef tallow, and epoxidized butter, and a mixture of two or more of the above compounds.

Epoxidized peanut oil, epoxidized cottonseed oil, epoxidized corn oil, epoxidized soybean oil, epoxidized olive oil, epoxidized linseed oil, and epoxidized tung oil are preferably used as non-coordinating proton acceptors.

The non-coordinating proton acceptor is more preferably epoxidized soy bean oil (ESBO).

These epoxidized compounds are formed from the corresponding oils and fats, using standard methods known in the art for converting unsaturated compounds into epoxides.

Table 1 provides a list of these corresponding fats and oils, showing the percentages of the constituent fatty acids in each fat or oil.

TABLE 1

Fatty Acid Composition of Fats and Oils.

| | Saturated acids, % | | | | | | Unsaturated acids, % | | | | | |
|---|---|---|---|---|---|---|---|---|---|---|---|---|
| | | | | | | | | Enoic | | | Dienoic | Trienoic |
| Fat or Oil | $C_8$ | $C_{10}$ | $C_{12}$ | $C_{14}$ | $C_{16}$ | $C_{18}$ | $>C_{18}$ | $<C_{16}$ | $C_{16}$ | $C_{18}$ | $>C_{18}$ | $C_{18}$ | $C_{18}$ |
| Beef tallow | | | 0.2 | 2–3 | 25–30 | 21–26 | 0.4–1 | 0.5 | 2–3 | 39–42 | 0.3 | 2 | |
| Butter | 1–2[a] | 2–3 | 1–4 | 8–13 | 25–32 | 8–13 | 0.4–2 | 1–2 | 2–5 | 22–29 | 0.2–1.5 | 3 | |
| Coconut | 5–9 | 4–10 | 44–51 | 13–18 | 7–10 | 1–4 | | | | 5–8 | 0–1 | 1–3 | |
| Corn | | | | 0–2 | 8–10 | 1–4 | | | 1–2 | 30–50 | 0–2 | 34–56 | |
| Cottonseed | | | | 0–3 | 17–23 | 1–3 | | | | 23–44 | 0–1 | 34–55 | |
| Lard | | | | 1 | 25–30 | 12–6 | | 0.2 | 2–5 | 41–51 | 2–3 | 3–8 | |
| Olive | | | 0–1 | 0–2 | 7–20 | 1–3 | 0–1 | | 1–3 | 53–86 | 0–3 | 4–22 | |
| Palm | | | | 1–6 | 32–47 | 1–6 | | | | 40–52 | | 2–11 | |

TABLE 1-continued

Fatty Acid Composition of Fats and Oils.

| | Saturated acids, % | | | | | | | Unsaturated acids, % | | | | | |
|---|---|---|---|---|---|---|---|---|---|---|---|---|---|
| | | | | | | | | | Enoic | | | Dienoic | Trienoic |
| Fat or Oil | $C_8$ | $C_{10}$ | $C_{12}$ | $C_{14}$ | $C_{16}$ | $C_{18}$ | $>C_{18}$ | $<C_{16}$ | $C_{16}$ | $C_{18}$ | $>C_{18}$ | $C_{18}$ | $C_{18}$ |
| Palm kernal | 2–4 | 3–7 | 45–52 | 14–19 | 6–9 | 1–3 | 1–2 | | 0–1 | 10–18 | | 1–2 | |
| Peanut | | | | 0.5 | 6–11 | 3–6 | 5–10 | | 1–2 | 39–66 | | 17–38 | |
| Soybean | | | | 0.3 | 7–11 | 2–5 | 1–3 | | 0–1 | 22–34 | | 50–60 | 2–10 |
| | | | | | | | | | | | $C_{20}$ $>C_{20}$ | | |
| Codliver | | | | 2–6 | 7–14 | 0–1 | | 0–2 | 10–20 | 25–31 | 25–32 10–20 | | |
| Linseed | | | | 0.2 | 5–9 | 4–7 | 0.5–1 | | | 9–29 | | 8–29[b] | 45–67[c] |
| Tung | | | | | | | | | | 4–13 | | 8–15 | 78–82[d] |

[a]3–4% $C_4$ 1–2% $C_6$.
[b]Linoieic acid, cis, cis-9, 12-octadecadienoic acid.
[c]Linolenic acid, cis, cis, cis-9, 12, 15-octadecatrienoic acid.
[d]Eleostearic acid, cis, trans, trans-9, 11, 13-octadecatrienoic acid, and 3–6% saturated acids.

The non-coordinating proton acceptor may also be an ester comprising epoxide moieties. Such an ester may be an ester of a fatty acid comprising epoxide moieties of formula (III):

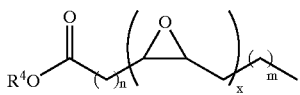

(III)

or an ester of an alcohol comprising epoxide moieties of formula (IV):

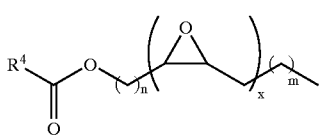

(IV)

where, in each formula n=1 to 7
x=1 to 3,
m=1 to 6, and
$R^4$ is a hydrocarbyl group, for example, a $C_1$–$C_6$ alkyl group.

The non-coordinating proton acceptor may also be an amide comprising epoxide moieties. Such an amide may be an amide of a fatty acid comprising epoxide moieties of formula (V):

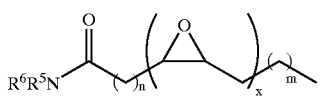

(V)

or an amide of an amine comprising epoxide moieties of formula (VI):

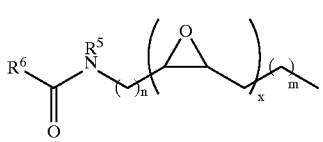

(VI)

where n=1 to 7,
x=1 to 3,
m=1 to 6, and $R^5$ and $R^6$ are chosen, independently of each other, from hydrogen, and a hydrocarbyl group, e.g. a $C_1$–$C_6$ alkyl group.

The non-coordinating proton acceptor may suitably be used in the range of from 0.3 to 20 parts by weight per hundred parts by weight of copolymer, preferably 0.5 to 10 parts by weight per hundred parts by weight of copolymer, most preferably 0.5 to 5 parts by weight, per hundred parts by weight of copolymer.

Many conjugated dienes are used in copolymer rubbers and all can be used in the process of the present invention. Mention is made of 1,3-butadiene, isoprene, 2,3-dimethyl-1,3-butadiene, 1,3-pentadiene and piperylene, of which 1,3-butadiene is preferred.

The nitrile is normally acrylonitrile or methacrylonitrile, of which acrylonitrile is preferred.

The copolymer that undergoes hydrogenation in the present invention may comprise from 95 to 50% by weight, preferably 70 to 60% by weight of conjugated diene, and from 5 to 50% by weight, preferably 30 to 40% by weight of an unsaturated nitrile. The copolymer may also contain up to about 45%, preferably up to 40%, more preferably up to 10%, of one or more copolymerizable monomers, for example, an ester of an unsaturated acid, such as ethyl, propyl or butyl acrylate or methacrylate, or a vinyl compound, for example, styrene, α-methylstyrene or a corresponding compound bearing an alkyl substituent on the phenyl ring, for instance, a p-alkylstyrene such as p-methylstyrene. Other copolymerizable monomers include α,β-unsaturated acids, for example, acrylic, methacrylic, ethacrylic, crotonic, maleic (possibly in the form of its anhydride), fumaric or itaconic acid, and other conjugated dienes, for example 2,3-dimethyl-1,3-butadiene, 1,3-pentadiene, isoprene, and piperylene. Preferably, the copolymer is a solid that has a molecular weight in excess of about 60,000, most preferably in excess of about 100,000. There is effectively no upper limit on the molecular weight of the copolymer, however, the molecular weight of the copolymer will usually not exceed 1,000,000.

The copolymer that is to be hydrogenated can be made in known manner, by emulsion or solution polymerization, resulting in a statistical copolymer. The copolymer will have a backbone composed entirely of carbon atoms. It will have some vinyl side-chains, caused by 1,2-addition of the conjugated diene during the copolymerization. It will also have double bonds in the backbone from 1,4-addition of the diene. Some of these double bonds will be in the cis and most in the trans orientation. These carbon—carbon double bonds are selectively hydrogenated by the process of the present invention, without concomitant hydrogenation of the nitrile groups present in the copolymer. If carboxyl groups (from an α,β-unsaturated acid) are present, it is desired that these should not undergo hydrogenation.

Processes for the hydrogenation of NBR are known and may also be used for the production of the hydrogenation products according to the present invention. A complex of rhodium or palladium, is generally used as the catalyst, although platinum, iridium, rhenium, ruthenium, osmium, cobalt or copper in the form of the metals, but preferably in the form of metal compounds, may also be used, cf. for example U.S. Pat. No. 3,700,637; DE-PS 2,539,132; EP 134 023; DE-OS 35 41 689; DE-OS 35 40 918; EP-A 298 386; DE-OS 3529252; DE-OS 34 33 392; U.S. Pat. No. 4,464,515; and U.S. Pat. No. 4,503,196, all of which are incorporated herein by reference.

Suitable catalysts and solvents for hydrogenation in the homogeneous phase are described in the following, and in GB 1558491 of Bayer AG and in EP 471,250, incorporated herein by reference. It is not intended to restrict the catalysts and solvents for hydrogenation useful for the invention, and these are provided only by way of example. The hydrogenation can be achieved by means of a rhodium-complex catalyst. The preferred catalyst is of the formula (VII):

$$(R_mB)_lRhX_n \qquad (VII)$$

in which each R is a $C_1$–$C_8$-alkyl group, a $C_4$–$C_8$-cycloalkyl group a $C_6$–$C_{15}$-aryl group or a $C_7$–$C_{15}$-aralkyl group; B is phosphorus, arsenic, sulfur, or a sulfoxide group S=O; X is hydrogen or an anion, preferably a halide and more preferably a chloride or bromide ion; I is 2, 3 or 4, preferably 3; m is 2 or 3; and n is 1, 2 or 3, preferably 1 or 3. Preferred catalysts are tris-(triphenylphosphine)-rhodium(I)-chloride, tris(triphenylphosphine)-rhodium(III)-chloride and tris-(dimethylsulfoxide)-rhodium(III)-chloride, and tetrakis-(triphenylphosphine)-rhodium hydride of formula $((C_6H_5)_3 P)_4RhH$, and the corresponding compounds in which triphenylphosphine moieties are replaced by tricyclohexylphosphine moieties. The catalyst can be used in small quantities. An amount in the range of 0.01 to 1.0%, preferably 0.02% to 0.6%, more preferably 0.03 to 0.2%, most preferably 0.06 to 0.12% by weight based on the weight of copolymer is suitable.

The catalyst is used with a co-catalyst that is a ligand of formula $R_mB$, where R, m and B are as defined above, and m is preferably 3. Preferably B is phosphorus, and the R groups can be the same or different. Thus, there can be used a triaryl, trialkyl, tricycloalkyl, diaryl monoalkyl, dialkyl monoaryl, diaryl monocycloalkyl, dialkyl monocycloalkyl, dicycloalkyl monoaryl or dicycloalkyl monoaryl co-catalysts. Examples of co-catalyst ligands are given in U.S. Pat. No. 4,631,315, the disclosure of which is incorporated by reference. Examples of co-catalyst ligands given in U.S. Pat. No 4,631,315 include triphenylphosphine, diethylphenylphosphine, tritolylphosphine, trinaphthylphosphine, diphenylmethylphosphine, diphenylbutylphosphine, tris-(p-carbomethoxyphenyl)-phosphine, tris-(p-cyanophenyl)-phosphine, tributylphosphine, tris-(trimethoxyphenyl)-phosphines, bis-(trimethylphenyl)-phenyl-phosphines, bis-(trimethoxyphenyl)-phenylphosphines, trimethyl phenyldiphenylphosphines, trimethoxyphenyidiphenylphosphines, tris-(d imethylphenyl)-phenylphosphines, tris-(dimethoxyphenyl)-phosphines, bis-(dimethylphenyl)-phenyl-phosphines, bis-(dimethoxyphenyl)-phenylphosphines, dimethylphenyidiphenylphosphines, dimethoxyphenyldiphenylphosphines, triphenylarsine, ditolylphenylarsine, tris-(4-ethoxyphenyl)-arsine, diphenylcyclohexylarsine, dibutylphenylarsine and diethylphenylarsine are preferred ligands.

Further examples of co-catalyst ligands are bisphosphines corresponding to the formula (VIII):

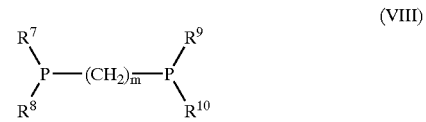

(VIII)

in which m represents an integer from 1 to 10 and the groups $R^7$, $R^8$, $R^9$, $R^{10}$ which may be the same or different represent alkyl, cycloalkyl, aryl, or aralkyl radicals, these groups optionally being substituted by alkyl, hydroxy, alkoxy, carbalkoxy or halogen groups.

Other examples of co-catalyst ligands are compounds corresponding to the formula (IX):

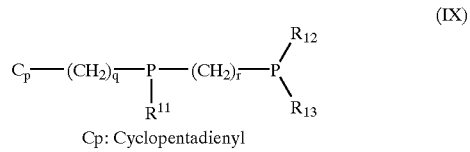

(IX)

Cp: Cyclopentadienyl wherein q and r which may be the same or different represent an integer from 1 to 6 and the radicals $R_{11}$, $R_{12}$ and $R_{13}$ which may be the same or different have the same meaning as $R_7$–$R_{10}$.

Examples of such ligands are 1,4-diphospha-6-cyclopentadienyl-1,1,4-triphenylhexane, preferably 1,5-diphospha-7-cyclopentadienyl-1,1,5-triphenylheptane and, in particular, 1,6-diphospha-8-cyclopentadienyl-1,1,6-triphenyloctane.

The preferred co-catalyst ligand is triphenylphosphine. The co-catalyst ligand is suitably used in an amount in the range of from 0.1 to 33% more 0.2 to 20%, preferably 0.3 to 5%, more preferably 0.5 to 4%, based on the weight of the copolymer. Preferably, the weight ratio of the catalyst compound to co-catalyst is in the range 1:3 to 1:66, preferably in the range 1:5 to 1:45.

Triphenylphosphine is difficult to separate from the hydrogenated copolymer product, and if it is present in any significant quantity may create some difficulties in processing of the hydrogenated product. The use of a non-coordinating proton acceptor lowers the amount of triphenylphosphine cocatalyst needed in the hydrogenation reaction, without lowering the efficiency of the reaction. In addition, It is not necessary to remove an ESBO-like proton acceptor from the final copolymer as it has the additional beneficial property of acting as a plasticizer. Use of a proton acceptor in place of part of the co-catalyst, therefore, gives rise to significant and unexpected advantages.

The hydrogenation reaction can be carried out in solution. The solvent must be one that will dissolve the copolymer. This limitation excludes use of unsubstituted aliphatic hydrocarbons. Suitable organic solvents are aromatic compounds including halogenated aryl compounds of 6 to 12 carbon atoms. The preferred halogen is chlorine and the preferred solvent is a chlorobenzene, especially monochlorobenzene (MCB). Other solvents that can be used include toluene, halogenated aliphatic compounds, especially chlorinated aliphatic compounds, ketones such as methyl ethyl ketone and methyl isobutyl ketone, tetrahydrofuran and dimethylformamide. The concentration of copolymer in the solvent is not particularly critical but is suitably in the range from 1 to 20% by weight, preferably from 2.5 to 15% by weight and more preferably 10 to 15% by weight. The concentration of the solution may depend upon the molecular weight of the copolymer rubber that is to be hydrogenated. Rubbers of higher molecular weight are more difficult to dissolve, and so are used at lower concentration.

The reaction can be carried out in a wide range of pressures, from 10 to 250 atm. and preferably from 50 to 100 atm. The temperature range can also be wide. Temperatures from 40 to 160°, preferably 100 to 160° C., are suitable and from 110 to 140° C. are preferred. Under these conditions, the hydrogenation is usually completed in about 3 to 7 hours, although longer or shorter reaction times can be used if required. Preferably, the reaction is carried out, with agitation, in an autoclave.

To extract the copolymer from the hydrogenation mixture, the mixture can be worked up by any suitable method. One method is to distill off the solvent. Another method is to inject steam, followed by drying the copolymer. Another method is to add an alcohol, to cause the copolymer to coagulate.

The copolymer of the present invention can be compounded with any of the usual compounding agents, for example fillers such as carbon black or silica, heat stabilizers, antioxidants, activators such as zinc oxide or zinc peroxide, curing agents, co-agents, processing oils and extenders. Such compounds and co-agents are known to persons skilled in the art.

The invention is further illustrated in the following non-limiting examples and the accompanying drawing, of which:

FIG. 1 is a graph of the average percent hydrogenation of Krynac® X7.40 vs. time, as a function of the amount of added ESBO.

Example 1 illustrates hydrogenation of a carboxylated acrylonitrile-butadiene rubber, Krynac® X7.40 (available from Bayer) with-out the addition of a proton acceptor. Example 2 illustrates the hydrogenation of Krynac® X7.40 in the presence of ESBO as proton acceptor.

Example 1

In an experiment with a 6% copolymer load, 184 g of Krynac® X7.40 (a statistical terpolymer of methacrylic acid (7%)-acrylonitrile (28%)-butadiene (65%), ML 1+4/100° C.=40) was dissolved in 2.7 kg of monochlorobenzene. The copolymer solution was transferred to a 2 gallon Parr high pressure reactor and nitrogen/argon was then passed through the copolymer solution for 10 minutes. The reactor was then degassed 3 times with pure $H_2$ (100–200 psi) under full agitation. The temperature of the reactor was raised to 130° C. and a solution of 0.139 g (0.076 phr) of tris-(triphenylphosphine)-rhodium-(I)chloride and 2.2 g of triphenylphosphine in 60 mL of monochlorobenzene was then charged to the reactor under hydrogen. The temperature was raised to 138° C. and the pressure of the reactor was set at 1200 psi. The reaction temperature and hydrogen pressures of the reactor were maintained constant throughout the whole reaction. The degree of hydrogenation was monitored by sampling after a certain reaction time followed by FTIR analysis of the sample. The hydrogenation was carried out for a certain period of time at 138° C. under a hydrogen pressure of 1200 psi. The monochlorobenzene was removed by the injection of steam and the copolymer was dried in an oven at 80° C. The values of % hydrogenation (% hyd.) were determined by IR spectroscopy and $^1$H-NMR. Table 2 gives the values of % hydrogenation (% hyd.) as a function of time for three separate runs, as well as the average values of % hydrogenation determined as a function of time for all three runs. The average values of % hydrogenation are plotted as a function of time in FIG. 1.

TABLE 2

Hydrogenation of Krynac® X7.40 in the Absence of ESBO.

| Time (min) | Run 1 % hyd. | Run 2 % hyd. | Run 3 % hyd. | Average % hyd. |
|---|---|---|---|---|
| 0 | 0 | 0 | 0 | 0 |
| 60 | 77.5 | 64.9 | 66.4 | 69.6 |
| 120 | 83.2 | 74.8 | 76.7 | 78.2 |
| 180 | 85 | 81.5 | 83.7 | 83.4 |
| 240 | 85 | 83 | 83.7 | 83.9 |

Copolymer Load: 6%; Catalyst Load: 0.076 phr; Co-catalyst Load: 1.26 phr.

Example 2

Hydrogenation reactions were carried out as in Example 1, except that 2 or 7 phr of ESBO was added to the copolymer cement before the copolymer hydrogenation. Table 3 gives the values of % hydrogenation (% hyd., as determined by IR spectroscopy and $^1$H-NMR) as a function of time for two different groups of runs; each group of runs was conducted with a different amount of ESBO added (2 or 7 phr ESBO). The average values of % hydrogenation determined as a function of time from the two runs of each group are also shown. These average values of % hydrogenation were plotted as a function of time in FIG. 1.

TABLE 3

Hydrogenation of Krynac® X7.40 in the Presence of ESBO.

| | 2 phr ESBO | | | 7 phr ESBO | | |
|---|---|---|---|---|---|---|
| Time (min) | Run 1 % hyd. | Run 2 % hyd. | Average % hyd. | Run 1 % hyd. | Run 2 % hyd. | Average % hyd. |
| 0 | 0 | 0 | 0 | 0 | 0 | 0 |
| 60 | 82.6 | 81.5 | 82.0 | 86.2 | 71.8 | 79 |
| 120 | 87.8 | 88.0 | 87.9 | 92.3 | 83.4 | 87.8 |
| 180 | 89.4 | 89.5 | 89.4 | 93.6 | 90.2 | 91.9 |
| 240 | 90.2 | 90.3 | 90.2 | 94.1 | 92.6 | 93.4 |

Copolymer load: 6%; Catalyst Load: 0.076; Co-catalyst Load: 1.26 phr.

It is evident that the presence of ESBO accelerated the rate of hydrogenation of Krynac® X7.40. In the cases where no ESBO was added, less than 85% hydrogenation was achieved. With 2 phr ESBO greater than 85% hydrogenation was achieved.

Examples 3 and 4 show the hydrogenation of an acrylonitrile-butadiene copolymer, Perbunan® NT 3429T (available from Bayer), without and with the addition of ESBO, respectively.

Example 3

In an experiment with a 12% copolymer load, 392 g of Perbunan® NT 3429T (statistical copolymer of acrylonitrile (34%)-butadiene (66%), Mooney ML 1+4=30) was dissolved in 2.6 kg of monochlorobenzene. The copolymer lution was transferred to a 2 gallon Parr high pressure reactor and nitrogen/argon was then passed through the copolymer solution for 10 minutes. The reactor was then degassed 3 times with pure $H_2$ (100–200 psi) under full agitation. The temperature of the reactor was raised to 130° C. and a solution of 0.176 g (0.045 phr) of tris-(triphenylphosphine) rhodium (1) chloride catalyst and 3.92 g of co-catalyst triphenylphosphine in 60 mL of monochlorobenzene was then charged to the reactor under hydrogen. The temperature was then raised to 138° C. and the pressure of the reactor was set at 1200 psi. The reaction temperature and hydrogen pressure of the reactor were maintained constant throughout the reaction. The degree of hydrogenation was monitored by sampling after a certain reaction time followed by FTIR analysis of the sample. The hydrogenation was carried out after a certain period of time at 138° C. under a hydrogen pressure of 1200 psi. The chlorobenzene was removed by the injection of steam and the copolymer was dried in an oven at 80° C. The hydrogenation results (as determined by IR spectroscopy and $^1$H-NMR) of two runs are given in Table 4.

TABLE 4

Hydrogenation of Perbunan ® NT 3429T in the Presence of 1 phr Triphenylphosphine.

| Time (min) | Run 1 % hyd. | Run 2 % hyd. |
|---|---|---|
| 0 | 0 | 0 |
| 60 | 90.6 | 87.2 |
| 120 | 96.9 | 96.7 |
| 180 | 98.4 | 98.7 |
| 240 | 98.9 | 99.2 |

Copolymer Load: 12%; Catalyst Load: 0.045 phr; Co-catalyst Load: 1 phr.

Example 4

A hydrogenation reaction was carried out as in Example 3, except that 2.0 phr of ESBO was added to the copolymer cement before the hydrogenation. The hydrogenation results are summarized in Table 5.

TABLE 5

Hydrogenation of Perbunan ® NT 3429T in the presence of 1 phr triphenylphosphine and 2.0 phr ESBO.

| Time (min) | % hyd. |
|---|---|
| 0 | 0 |
| 60 | 89.4 |
| 120 | 97.7 |
| 180 | 99.3 |

Copolymer Load: 12%; Catalyst Load: 0.045 phr; Co-catalyst Load: 1 phr.

The hydrogenation of Perbunan® NT 3429T occurred much faster than that of the carboxylated copolymer, Krynac® X7.40. In general, an acrylonitrile-butadiene copolymer can be hydrogenated easily to 97–98% saturation, than the rate of hydrogenation slows down significantly. It is well known that the age properties of a hydrogenated acrylonitrile-butadiene copolymer improve significantly as the percent hydrogenation approaches 100. It is economically beneficial to hydrogenate an acrylonitrile-butadiene copolymer to greater than 99% as quickly as possible. As shown in Table 4 and 5, the presence of ESBO increases the rate of hydrogenation of Perbunan® NT 3429T. Without ESBO, the percent hydrogenation was between 96.7 and 96.9% after two hours; 98.9–99.2% hydrogenation was achieved after four hours of reaction. With the addition of ESBO, the percent hydrogenation was about 97.7% after two hours. A total of 99.3% hydrogenation was achieved in only three hours of reaction. The use of ESBO, therefore, saves about 25% reaction time.

Example 5

This example shows the hydrogenation of Perbunan® NT 3429T using 2 phr ESBO, in the absence of the triphenylphosphine co-catalyst.

Following the procedure of Example 3, the hydrogenation reaction of Perbunan® NT 3429T (butadiene (66%)-acrylonitrile (34%), Mooney ML 1+4=30) was carried out in the presence of 2 phr ESBO. The hydrogenation results (as determined by IR spectroscopy and 1 H-NMR) are given in Table 6.

TABLE 6

Hydrogenation of Perbunan ® NT 3429T in the Absence of Triphenylphosphine Co-catalyst and in the Presence of 2 phr ESBO.

| Time (min) | % hyd. |
|---|---|
| 0 | 0 |
| 60 | 61.9 |
| 120 | 65.6 |
| 180 | 73.5 |
| 240 | 78.8 |

Copolymer Load: 12%; Catalyst load: 0.045 phr.

Without the use of co-catalyst, the percent hydrogenation reached only 78.8% after 4 hours of reaction. This result indicates that it is necessary to have a certain amount of co-catalyst present in order to have a reasonably fast hydrogenation reaction.

Example 6

This example shows the hydrogenation of Perbunan® NT 3429T using 0.3 phr triphenylphosphine co-catalyst, in the absence of ESBO.

Following the procedure of Example 3, hydrogenation reactions of Perbunan® NT 3429T (butadiene (66%)-acrylonitrile (34%), Mooney ML 1+4=30) were carried out in the absence of ESBO. The hydrogenation results (as determined by IR spectroscopy and $^1$H-NMR) are given in Table 7.

TABLE 7

Hydrogenation of Perbunan ® NT 3429T in the Presence of 0.3 phr Triphenylphosphine and 0 phr ESBO.

| Time (min) | Run 1 % hyd. | Run 2 % hyd. |
|---|---|---|
| 0 | 0 | 0 |
| 60 | 84.6 | 84 |
| 120 | 94.9 | 96 |
| 180 | 97.5 | 97.5 |
| 240 | 98.6 | 98.4 |

Copolymer Load: 12%; Catalyst Load: 0.045 phr; Triphenylphosphine: 0.3 phr.

When 0.3 phr TPP was used as co-catalyst, 97.5% hydrogenation was achieved in 3 hours, but only 98.4–98.6% hydrogenation was achieved in 4 hours of reaction, which is slower than the reaction with 1 phr triphenylphosphine (example 3, table 4).

Example 7

This example shows the hydrogenation of Perbunan® NT 3429T, using 0.3 phr triphenylphosphine co-catalyst, and 2 phr ESBO.

Following the procedure of Example 3, hydrogenation reactions of butadiene-acrylonitrile 34% ACN (Mooney ML 1+4=30) were carried out in the presence of 2 phr ESBO. The hydrogenation results (as determined by IR spectroscopy and $^1$H-NMR) are given in Table 8.

TABLE 8

Hydrogenation of Perbunan ® NT 3429T in the Presence of 0.3 phr TPP and 2 phr ESBO.

| Time (min) | Run 1 % hyd. | Run 2 % hyd. | Run 3 % hyd. |
| --- | --- | --- | --- |
| 0 | 0 | 0 | 0 |
| 60 | 88.1 | 89.2 | 86.1 |
| 120 | 96.4 | 97.4 | 94.8 |
| 180 | 98.6 | 98.9 | 98.4 |
| 240 | 99.3 | 99.5 | 99.2 |

Substrate: Perbunan® NT 3429 T; Copolymer load: 12%; Catalyst load: 0.045 phr; TPP: 0.3 phr.

With the use of 0.3 phr TPP co-catalyst and 2 phr ESBO, 96.4–96.6% hydrogenation was achieved in 3 hours, and 99.2–99.5% hydrogenation was achieved in 4 hours of reaction. These hydrogenation results are as good as those of reactions with 1 phr triphenylphosphine.

This example demonstrates that the addition of a proton acceptor can reduce the amount of co-catalyst loading and still result in enhanced hydrogenation efficiency. In this example, we show that the presence of 2 phr ESBO can permit a reduction of 0.7 phr in the amount of triphenylphosphine co-catalyst used.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process of hydrogenating a nitrile copolymer rubber, which comprises the step of subjecting the copolymer rubber to hydrogenation in the presence of a metal-complex hydrogenation catalyst, a co-catalyst, and a proton acceptor that is non-coordinating with the metal-complex catalyst, wherein the non-coordinating proton acceptor is a triacyiglycerol comprising epoxide moieties.

2. A process according to claim 1, wherein the non-coordinating proton acceptor is a molecule of formula:

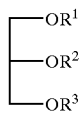

wherein $R^1$, $R^2$, and $R^3$ are, independently of each other, hydrogen or a group of formula:

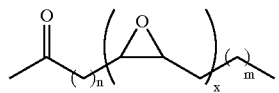

where n=1 to 7,
x=1 to 3, and
m=1 to 6,
wherein at least one of $R^1$, $R^2$ or $R^3$ is other than hydrogen.

3. A process according to claim 2, wherein the non-coordinating proton acceptor is a member selected from the group consisting of epoxidized soy bean oil, epoxidized linseed oil, epoxidized corn oil, epoxidized coconut oil, epoxidized cottonseed oil, epoxidized olive oil, epoxidized palm oil, epoxidized palm kernel oil, epoxidized peanut oil, epoxidized cod liver oil, epoxidized tung oil, epoxidized beef tallow, and epoxidized buffer, and mixture of two or more of the said members.

4. A process according to claim 3, wherein the non-coordinating proton acceptor is epoxidized soy bean oil.

5. A process according to claim 1, wherein the copolymer comprises from 95 to 50% by weight of a conjugated diene, from 5 to 50% by weight of an unsaturated nitrile and from 0 to 45% by weight of a copolymerizable monomer.

6. A process according to claim 5, wherein the conjugated diene is 1,3 butadiene.

7. A process according to claim 5, wherein the unsaturated nitrile is acrylonitrile.

8. A process according to claim 5, wherein the unsaturated nitrile is methacrylonitrile.

9. A process according to claim 5, wherein the copolymerizable monomer is an αβ-unsaturated carboxylic acid.

10. A process according to claim 9, wherein the αβ-unsaturated carboxylic acid is acrylic acid.

11. A process according to claim 9, wherein the αβ-unsaturated carboxylic acid is methacrylic acid.

12. A process according to claim 1, wherein the non-coordinating proton acceptor is used in the range of from 0.3 to 20 parts by weight per hundred parts by weight of copolymer.

13. A process according to claim 12, wherein the non-coordinating proton acceptor is used in the range of from 0.5 to 10 parts by weight per hundred parts by weight of copolymer.

14. A process according to claim 13, wherein the non-coordinating proton acceptor is used in the range of from 0.5 to 5 parts by weight per hundred parts by weight of copolymer.

15. A process according to claim 1, wherein the hydrogenation catalyst is selected from the group consisting of rhodium, platinum, iridium, palladium, rhenium, ruthenium, osmium, cobalt, copper, and complexes of these metals.

16. A process according to claim 15, wherein the hydrogenation catalyst is a rhodium-complex catalyst.

17. A process according to claim 16, wherein the rhodium-complex catalyst is a complex compound of the following formula: $(R_mB)_lRhX_n$ wherein,
R is a $C_1$–$C_8$ alkyl, $C_6$–$C_{15}$ aryl, or $C_7$–$C_{15}$ aralkyl;
B is P, As, S, or S(O);
X is Cl or Br;
l is 2,3 or 4;
m is 2 or 3;
and n is 1, 2 or 3.

18. A process according to claim 17, wherein l is 3, and n is 1 or 3.

19. A process according to claim 16, wherein the rhodium-complex catalyst is selected from the group consisting of tris(triphenylphosphine)-rhodium (I) chloride, tris(triphenylphosphine)-rhodium(III) chloride and tris(dimethyl sulfoxide)-rhodium(III) chloride.

20. A process according to claim 16, wherein the rhodium-complex catalyst is used in an amount of from 0.01 to 1.0% by weight of the dissolved copolymer.

21. A process according to claim 20, wherein the rhodium-complex catalyst is used in an amount of from 0.02 to 0.6% by weight of the dissolved copolymer.

22. A process according to claim 21, wherein the rhodium-complex catalyst is used in an amount of from 0.03 to 0.2% by weight of the dissolved copolymer.

23. A process according to claim 22, wherein the co-catalyst is a compound of formula $R_mB$, wherein, R is a $C_1$–$C_8$ alkyl, $C_6$–$C_{15}$ aryl, or $C_7$–$C_{15}$ arakyl;

B is P, As, S, or S(O);

and m is 2 or 3.

24. A process according to claim 23, wherein the co-catalyst is triphenylphosphine.

25. A process according to claim 23, wherein the amount of co-catalyst is in the range 0.1 to 33 parts by weight per hundred parts by weight of copolymer.

26. A process according to claim 25, wherein the amount of co-catalyst is in the range 0.2 to 20 parts by weight per hundred parts by weight of copolymer.

27. A process according to claim 26, wherein the amount of co-catalyst is in the range 0.3 to 5 parts by weight per hundred parts by weight of copolymer.

28. A process according to claim 1, wherein the weight ratio of catalyst to co-catalyst is in the range of 1:3 to 1:66.

29. A process according to claim 1, wherein the reduction is performed in a halogenated aromatic solvent of 6 to 12 carbon atoms.

30. A process according to claim 29, wherein the halogenated aromatic solvent is monochlorobenzene.

31. A process according to claim 1, which is carried out at a temperature in the range of 40° C. to 160° C. and a pressure in the range 10 to 250 atmospheres.

* * * * *